(12) United States Patent
Behm et al.

(10) Patent No.: US 9,152,974 B1
(45) Date of Patent: Oct. 6, 2015

(54) SYSTEMS AND METHODS FOR PROCESSING TRANSACTIONS

(75) Inventors: Douglas A. Behm, Phoenix, AZ (US); Sudhakar W. Gopal, Scottsdale, AZ (US); Trey Neemann, Glendale, AZ (US); Pavan Pemmaraju, Phoenix, AZ (US); Mike Rice, Phoenix, AZ (US); Geoffrey R. Wright, Anthem, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 35 days.

(21) Appl. No.: 13/221,757

(22) Filed: Aug. 30, 2011

Related U.S. Application Data

(63) Continuation of application No. 13/221,680, filed on Aug. 30, 2011.

(51) Int. Cl.
*G06Q 30/00* (2012.01)
*G06Q 30/02* (2012.01)

(52) U.S. Cl.
CPC ........ *G06Q 30/0228* (2013.01); *G06Q 30/0233* (2013.01); *G06Q 30/0274* (2013.01)

(58) Field of Classification Search
None
See application file for complete search history.

(56) References Cited

U.S. PATENT DOCUMENTS

| | | | |
|---|---|---|---|
| 2003/0009379 A1* | 1/2003 | Narasimhan et al. | 705/14 |
| 2004/0205023 A1* | 10/2004 | Hafer et al. | 705/43 |
| 2006/0208065 A1* | 9/2006 | Mendelovich et al. | 235/380 |
| 2006/0259390 A1 | 11/2006 | Rosenberger | |
| 2007/0129955 A1* | 6/2007 | Dalmia et al. | 705/1 |
| 2007/0198354 A1* | 8/2007 | Senghore et al. | 705/14 |
| 2007/0198406 A1* | 8/2007 | Bishop et al. | 705/40 |
| 2008/0010189 A1 | 1/2008 | Rosenberger | |
| 2008/0103968 A1* | 5/2008 | Bies et al. | 705/39 |
| 2008/0133351 A1* | 6/2008 | White et al. | 705/14 |
| 2008/0201224 A1* | 8/2008 | Owens et al. | 705/14 |
| 2009/0063261 A1 | 3/2009 | Scribner et al. | |
| 2009/0106112 A1* | 4/2009 | Dalmia et al. | 705/14 |
| 2009/0112639 A1 | 4/2009 | Robinson | |
| 2009/0259538 A1* | 10/2009 | Miller et al. | 705/14 |
| 2009/0271262 A1 | 10/2009 | Hammad | |
| 2009/0299841 A1* | 12/2009 | Bishop et al. | 705/14.21 |
| 2010/0057553 A1 | 3/2010 | Ameiss et al. | |
| 2010/0106589 A1* | 4/2010 | Etheredge et al. | 705/14.25 |

(Continued)

OTHER PUBLICATIONS

Final Office Action dated Sep. 10, 2013 in U.S. Appl. No. 13/221,680.

(Continued)

*Primary Examiner* — Matthew T Sittner
(74) *Attorney, Agent, or Firm* — Snell & Wilmer L.L.P.

(57) ABSTRACT

The present disclosure includes a system, method, and article of manufacture for performing dispute resolution. The method may include retrieving an identifier that associates a funds request with a rewards currency request, crediting, based on the identifier, a transaction account based upon the funds request, and crediting, based on the identifier, a rewards account based upon the rewards currency request. The method may further comprise crediting the transaction account less a value associated with the rewards currency request and/or generating a first statement that shows a funds balance and a second statement that shows a rewards currency balance. A funds balance may be credited by an amount associated with the funds request, and a rewards currency balance may be credited by an amount associated with the rewards currency request.

17 Claims, 6 Drawing Sheets

(56) References Cited

U.S. PATENT DOCUMENTS

| | | | |
|---|---|---|---|
| 2011/0087530 A1* | 4/2011 | Fordyce et al. | 705/14.17 |
| 2011/0093335 A1 | 4/2011 | Fordyce et al. | |
| 2011/0251922 A1 | 10/2011 | Cavagnaro | |
| 2011/0264581 A1* | 10/2011 | Clyne | 705/39 |
| 2011/0270665 A1* | 11/2011 | Kim et al. | 705/14.33 |
| 2012/0191525 A1* | 7/2012 | Singh et al. | 705/14.33 |
| 2012/0303535 A1 | 11/2012 | Guest, III | |

OTHER PUBLICATIONS

Office Action dated May 23, 2013 in U.S. Appl. No. 13/221,680.
Office Action dated Oct. 2, 2014 in U.S. Appl. No. 13/221,680.
Final Office Action dated Feb. 11, 2015 in U.S. Appl. No. 13/221,680.
Advisory Action dated Apr. 1, 2015 in U.S. Appl. No. 13/221,680.

* cited by examiner

SYSTEMS AND METHODS FOR PROCESSING TRANSACTIONS

CROSS REFERENCE TO RELATED APPLICATIONS

This application is a continuation of, claims priority to and the benefit of, U.S. Ser. No. 13/221,680 filed on Aug. 30, 2011 and entitled "Systems and Methods for Processing Transactions," which is incorporated by reference herein in its entirety.

BACKGROUND

1. Field

The present disclosure generally relates to transaction processing. More particularly, the present disclosure relates to systems and methods for processing split transactions.

2. Related Art

Transaction account issuers have for many years awarded loyalty points and/or other reward currencies to customers as an incentive to use and/or apply for a particular transaction account. Although these currencies have been redeemable for a variety of rewards (e.g., discounts, airfare, products, etc.), rewards based transactions have been traditionally processed separately from other credit or dollar based transactions. This has been the case even where customers have initiated transactions based both upon rewards as well as credit (i.e., "split transactions"). As a result of this split between the processing of credit and rewards, customers have typically been debited the full amount of a transaction and only later credited, for example, the value of a selected number of rewards points. Thus, existing systems often generate confusing, if not upsetting, monthly statements (e.g., because a customer may receive a statement that shows that the customer was debited the full value of a transaction, despite the customer's knowledge that points were applied to the transaction). A system that applies a customer's rewards currency to the customer's transactions such that the customer is not debited for the full value of a split transaction is therefore desirable. A system that is capable of resolving disputes arising from split transactions is also desirable.

SUMMARY

The present disclosure includes a system, method, and article of manufacture for performing dispute resolution. The method may include retrieving an identifier that associates a funds request with a rewards currency request, crediting, based on the identifier, a transaction account based upon the funds request, and crediting, based on the identifier, a rewards account based upon the rewards currency request. The method may further comprise crediting the transaction account less a value associated with the rewards currency request and/or generating a first statement that shows a funds balance and a second statement that shows a rewards currency balance. A funds balance may be credited by an amount associated with the funds request, and a rewards currency balance may be credited by an amount associated with the rewards currency request. The method may further comprise, in various embodiments, resolving a plurality of disputes associated with a plurality of account issuers and/or a plurality of merchants. The method may further comprise retrieving an amount associated with the funds request and an amount associated with the rewards currency request based upon the identifier.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
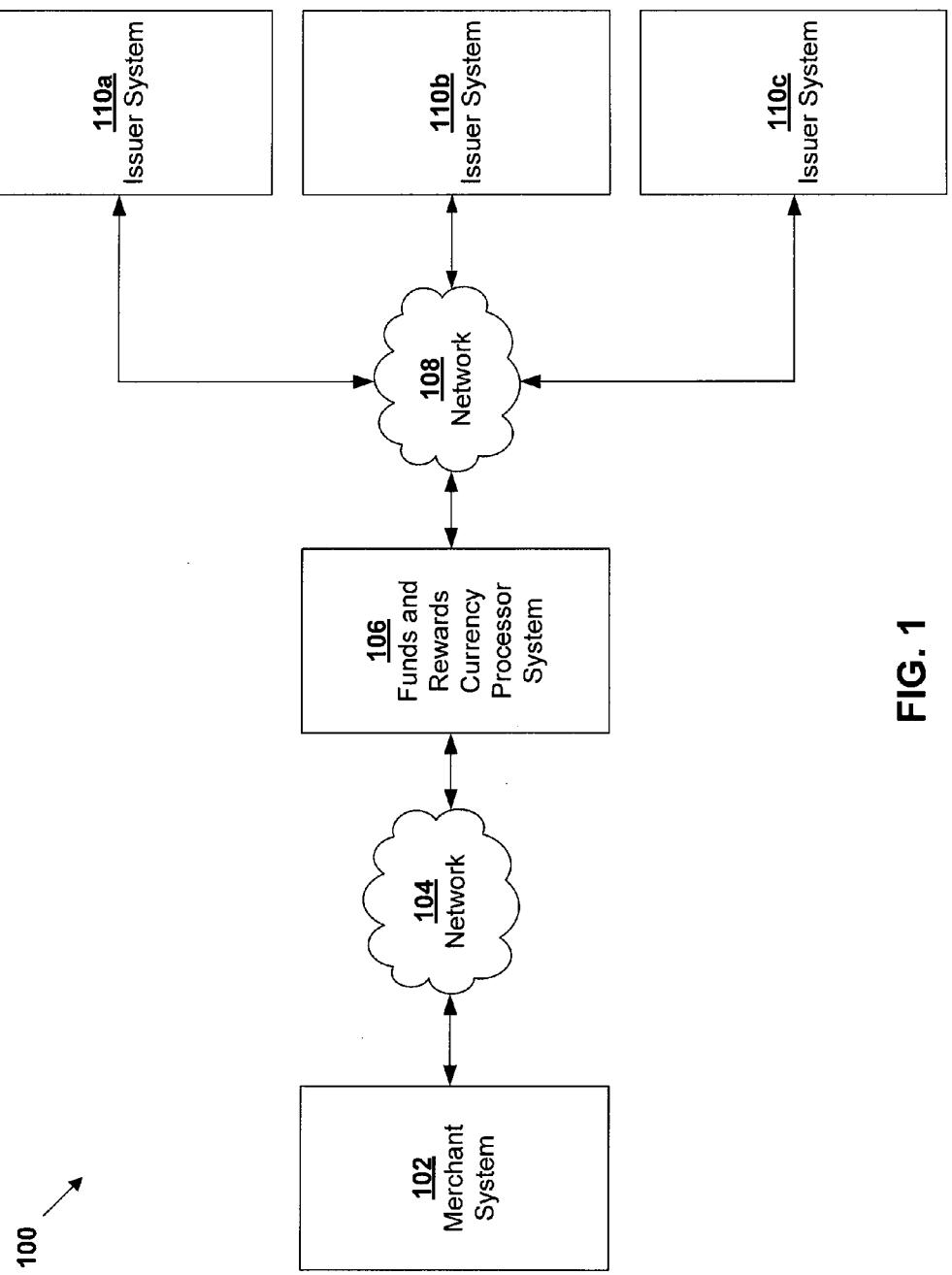
FIG. 1 shows an exemplary system diagram in accordance with various embodiments in which a single merchant system exists.

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Phrases similar to "transmit" may include sending electronic data from one system component to another over a network connection. Additionally, as used herein, "data" may include encompassing information such as commands, queries, files, data for storage, and the like in digital or any other form.

Phrases similar to "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

As used herein, "rewards currency" and/or "points" and/or "loyalty points" may refer to any type of non-credit or non-funds based currency, tender, and/or consideration. For example, rewards currency may include rewards points, points, non-monetary stored value, airfare, discounts, items, and the like.

Phrases similar to "funds" may refer to any type of monetary or credit based currency, tender, and/or consideration.

For example, funds may include funds associated with a checking and/or savings account, funds associated with a credit or charge based transaction account, and the like.

Phrases and terms similar to "account", "account number", "account code," "consumer account," "transaction account," and/or "rewards account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. An account number, code, or identifier may optionally be located on or associated with a rewards account, charge account, credit account, debit account, prepaid account, telephone card, embossed card, smart card, magnetic stripe card, bar code card, transponder, radio frequency card or an associated account. Further, and as described below, a funds request may be debited to a transaction account, while a rewards currency request may be debited to a rewards account.

Phrases similar to "transaction request" may include any indication by an individual that the individual wishes to request or initiate a transaction (e.g., that the individual wishes to make a purchase or "checkout"). A transaction request may include a funds request and/or a rewards currency request, as described below.

Phrases similar to "funds request" may comprise any request by an individual to apply funds (see above) towards the purchase of a particular item or items. Further, as used herein, a rewards currency request may comprise any request by an individual to apply rewards currency (see above) towards the purchase of a particular item or items.

Phrases similar to "split transaction" may comprise a transaction in which an individual requests application of funds as well as rewards currency towards the purchase of an item.

As used herein, "submission" or "submission process" may comprise a request for payment, a settlement request or process, and the like.

Figure 2:
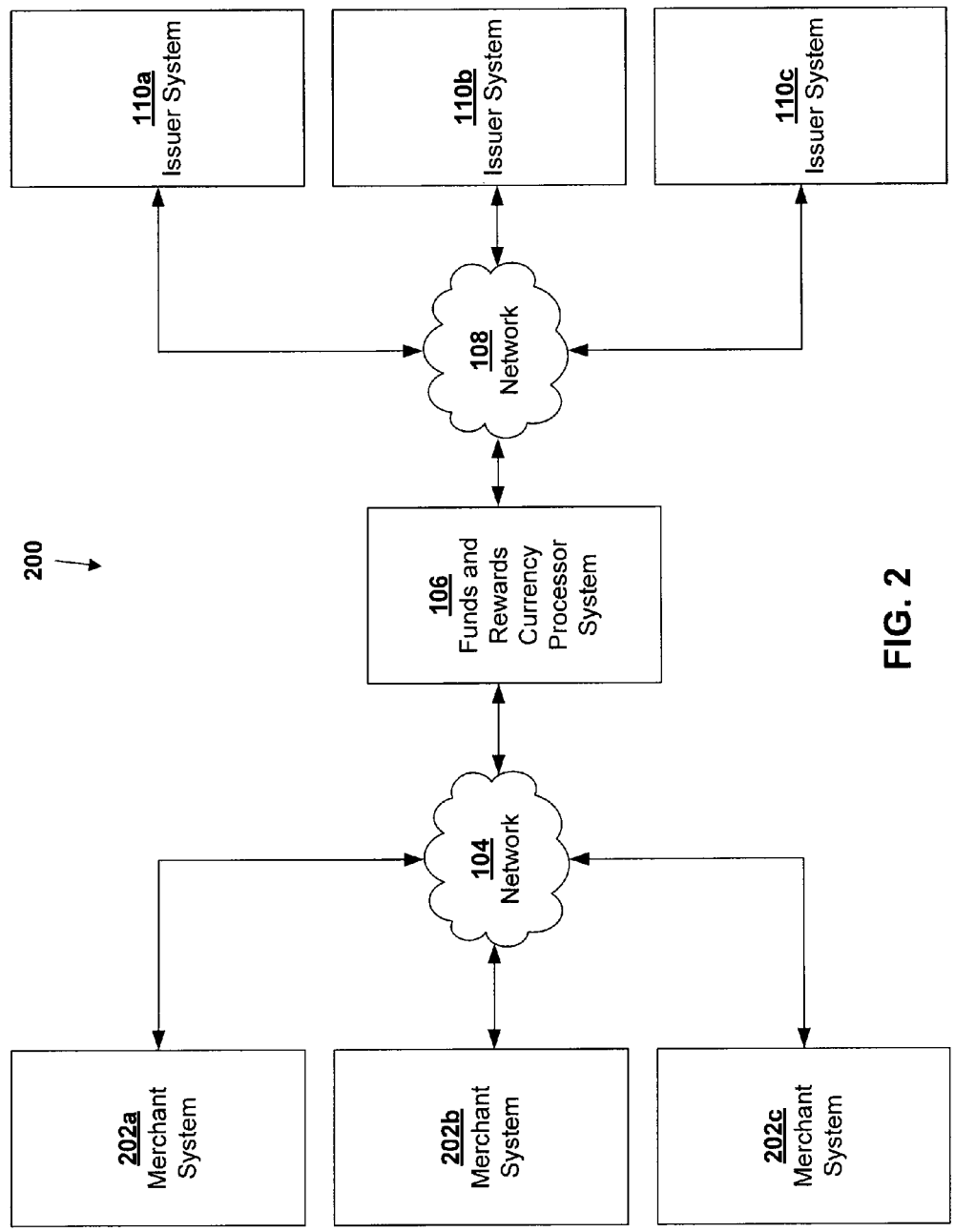
FIG. 2 shows an exemplary system diagram in accordance with various embodiments in which a plurality of merchant systems exist.

A system for processing transactions is disclosed. In various embodiments, a system for processing rewards currency and funds based transactions together as a split transaction is disclosed. Referring to FIGS. 1 and 2, two exemplary systems 100 and 200 for processing rewards currency and funds based transactions are disclosed. System 100 may comprise a merchant system 102, a network 104, a funds and rewards currency processor ("FRCP") system 106, a network 108, a first issuer system 110a, a second issuer system 110b, and/or a third issuer system 110c. Similarly, system 200 may comprise a first merchant system 202a, a second merchant system 202b, a third merchant system 202c, a network 104, FRCP system 106, a network 108, a first issuer system 110a, a second issuer system 110b, and/or a third issuer system 110c. Thus, system 200 may include a greater number of merchant systems 202a-202b than a system 100. Moreover, although systems 100 and 200 are shown with three issuer systems 110a-110b, and system 200 is shown with three merchant systems 202a-202b, a greater or fewer number of issuer systems and/or merchant systems are contemplated and within the scope of the present disclosure.

A merchant system 102 and/or 202a-202c may comprise any merchant system configured to receive and/or initiate the processing of a transaction request. To this end, a merchant system 102 and/or 202a-202c may comprise one or more point of sale ("POS") terminals, one or more server systems (e.g., one or more web-servers), one or more web clients (see below), any combination of these, and the like. For the sake of brevity, a merchant system 102 and/or 202a-202c may be referred to as a "merchant system" or "merchant systems." It should be understood that either term may refer to any or all of the merchant systems 102 and/or 202a-202c.

An FRCP system 106 may comprise any system configured to process a transaction and/or a transaction request. For instance, an FRCP system 106 may comprise one or more server systems, one or more web clients, and the like. An FRCP system 106 may process one or more funds based and/or one or more rewards currency based transactions, as described above. An FRCP system 106 may further process one or more split transactions and/or split transaction requests, also as described above.

An issuer system 110a-110c may comprise any system associated with a payment processor or an account issuer. For example, an issuer system 110a-110c may comprise an American Express, Visa, Mastercard, and/or any other system associated with a financial institution, bank or lender.

A system 100 and/or 200 may communicate via one or more networks 104 and/or 108. As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

Referring now to FIGS. 3-6, the process flows and screen-shots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3-6, but also to the various system components as described above with reference to FIGS. 1 and 2.

Figure 3:
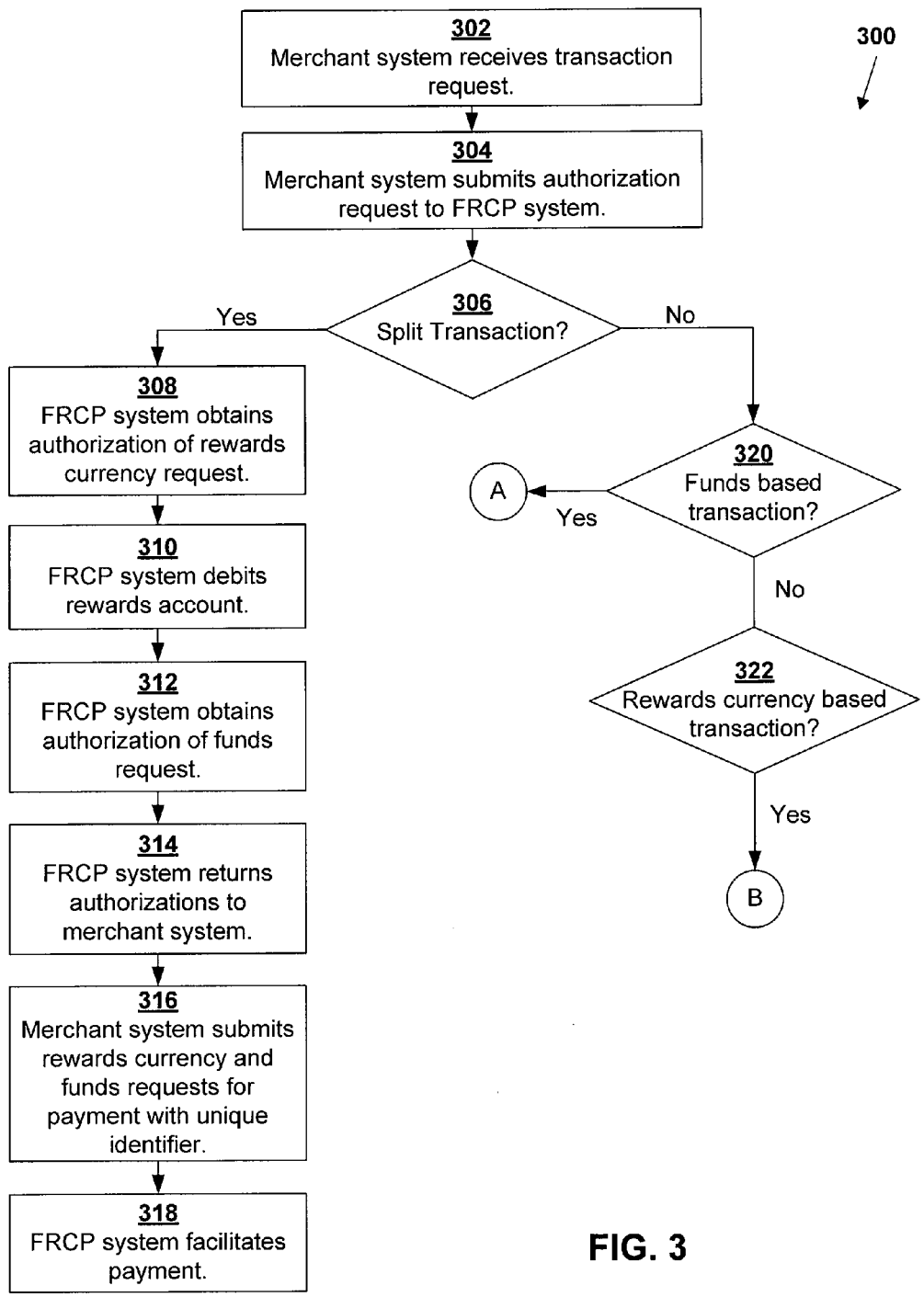
FIG. 3 shows a flowchart depicting an exemplary process for processing a split transaction.

With reference to FIG. 3, a process 300 for processing transactions is disclosed. In various embodiments, a merchant system may receive a transaction request (step 302). As described herein, a transaction request may comprise a funds request and/or a rewards currency request. In response to receiving a transaction request, a merchant system may submit an authorization request to an FRCP system 106 (step 304). An authorization request may comprise a request by a merchant for an FRCP system 106 to determine whether a particular transaction account and/or rewards account is associated with funds and/or rewards currency sufficient to make a purchase.

In response to receiving a transaction request, an FRCP system 106 may determine whether the transaction request comprises a request for a split transaction, as described above (step 306). Where a transaction request comprises a split transaction request, an FRCP system 106 may obtain an authorization for a rewards currency request (step 308) as well as an authorization for a funds request (step 312). An FRCP system 106 may further debit a rewards account (step 310) by an amount associated with the rewards currency request (e.g., a selected number of rewards points). An FRCP system 106 may communicate with one or more issuer systems 110a-110c to obtain an authorization and/or to debit a particular account. An issuer system 110a-110c may issue an authorization, for example, based upon funds associated with a transaction account and/or rewards currency associated with a rewards account. More particularly, an issuer system 110a-110c may issue an authorization provided an individual has sufficient funds associated with his transaction account and/or sufficient rewards currency associated with his rewards account. In various embodiments, authorization may not trigger reconciliation between an individual's transaction account and the funds approved for expenditure. That is, after authorization of funds, although an individual may receive an item from a merchant, the funds provided by the individual to the merchant as consideration for an item may not post to the individual's transaction account. Rather, this may occur as part of a submission process, as described herein. However, an individual's rewards account may be reconciled immediately and in response to authorization.

In response to receiving an authorization, an FRCP system 106 may return an authorization for a funds request and/or an authorization for a rewards currency request to a merchant system (step 314). A merchant system may, in turn, ship or provide a particular item to an individual or, more broadly, approve a particular transaction request. A merchant system may further submit a transaction request for payment, and this submission may be accompanied by an identifier that links or associates a particular funds request with a particular rewards currency request (step 316). More particularly, an identifier may link or associate a funds request with a rewards currency request where the funds request and the rewards currency request comprise a particular split transaction. An identifier may comprise, for instance, a purchase order identifier, a randomly generated identifier, an item identifier, and the like.

In response to receiving a submission, an FRCP system 106 may facilitate payment to a merchant or merchant system (step 318). Further, an FRCP system 106 may communicate with one or more issuer systems 110a-110c to reconcile an individual's transaction or rewards account against an expenditure of funds and/or rewards currency, as described above. Thus, in response to receiving a submission, an FRCP system 106 may facilitate the posting of a particular transaction to an individual's transaction account, whereby a merchant or a merchant system may receive payment. An FRCP system 106 may further generate (or facilitate the generation of) a first statement showing an individual's available funds and a second statement showing an individual's available rewards currency.

Accordingly, an individual may split a payment between funds and rewards currency. Systems 100 and/or 200 may permit the reconciliation or posting of rewards currency to an individual's rewards account immediately after authorization of a rewards currency request. This feature may confer upon the individual a more straightforward and less confusing purchasing process. For example, an individual may benefit, in that an individual may receive a first statement showing a balance of available funds as well as a second statement showing a balance of available rewards currency. The statement showing a balance of available funds may reflect that, for a particular transaction, an individual used a selected amount of rewards currency. Additionally, a statement showing a balance of available funds may reflect a purchase price associated with an item that is reduced by a value of rewards currency.

Figure 4:
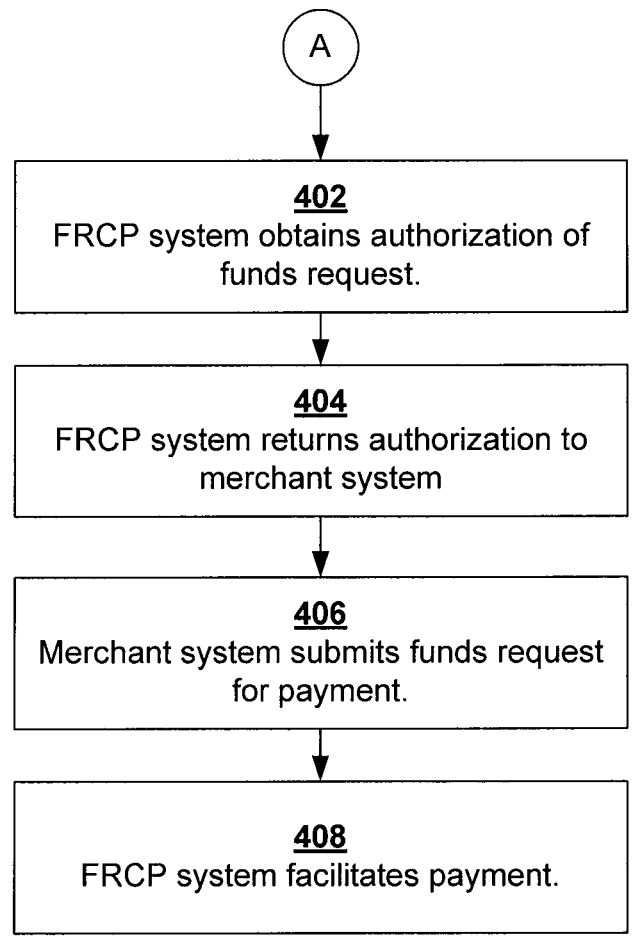
FIG. 4 shows a flowchart depicting an exemplary process for processing a transaction comprising a funds request.

With continuing reference to FIG. 3, where FRCP system 106 determines that a transaction request does not comprise a split transaction (e.g., by analyzing a consumer selection, the payment data and/or authorization data), the system 106 may, in addition, determine whether the transaction request comprises solely a funds request (step 320) and/or solely a rewards currency request (step 322).

Where a transaction request comprises solely a funds request, and with reference now to FIG. 4, an FRCP system 106 may obtain authorization for the funds request (step 402), as described above. For example, an FRCP system 106 may communicate with an issuer system 110a-110c to verify that a transaction account is associated with funds sufficient to purchase a particular item or items associated with the funds request. In response to receiving an authorization, an FRCP system 106 may return an authorization to a merchant system (step 404). A merchant system may, in response to receiving an authorization, ship or provide a particular item to an individual or, more broadly, approve a particular transaction request. A merchant system may further submit a funds request to FRCP system 106 (step 406), which may, in various embodiments, facilitate payment (step 408). An FRCP system 106 may facilitate payment. That is, for example, an FRCP system 106 may communicate with one or more issuer systems 110a-110c to reconcile an individual's transaction account against an expenditure of funds.

Figure 5:
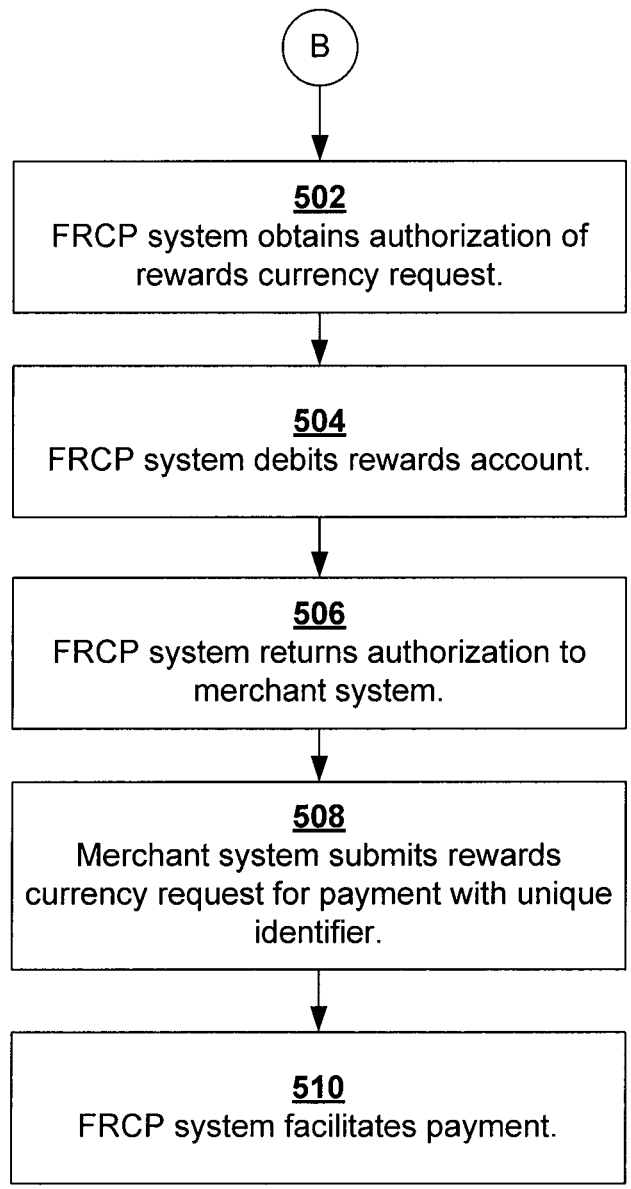
FIG. 5 shows a flowchart depicting an exemplary process for processing a transaction comprising a rewards currency request.

With reference now to FIG. 5, and where a transaction request comprises solely a rewards currency request, an FRCP system 106 may obtain authorization of the rewards currency request (step 502). Authorization may be obtained in the manner described herein with reference to FIG. 3 (i.e., an FRCP system 106 may communicate with an issuer system 110a-110c to determine whether an individual has rewards currency sufficient to make a particular purchase). In response to receiving an authorization, an FRCP system 106 may debit an individual's rewards account (step 504) and/or facilitate the debiting of an individual's rewards account (e.g., by communicating with an issuer system 110a-110c to debit a rewards account). Further, and as described herein, an FRCP system 106 may return an authorization to a merchant system (step 506), and the merchant system may, in response, approve a transaction request (e.g., ship or provide an item to an individual). A merchant may, in addition, submit a rewards currency request for payment to an FRCP system 106 (see herein with respect to the submissions process), and the submission may, in various embodiments, include an identifier (e.g., a purchase order identifier, a randomly generated identifier, an item identifier, and the like) (step 508). An FRCP system 106 may facilitate payment (e.g., an FRCP system 106 may communicate with one or more issuer systems 110a-110c to reconcile an individual's rewards account against an expenditure rewards currency) (step 510).

Figure 6:
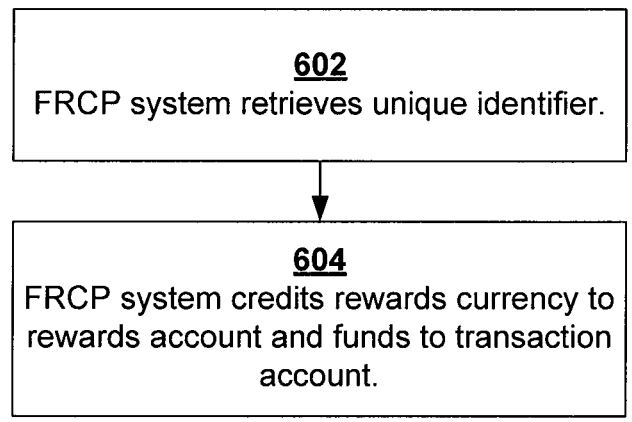
FIG. 6 shows a flowchart depicting an exemplary process for performing dispute resolution.

In various embodiments, and with reference to FIG. 6, a system 100 and/or 200 may perform dispute resolution. A dispute may arise, for example, as a result of an incorrectly shipped or damaged item. Where a dispute arises, a merchant may refund an individual's funds and/or rewards currency, depending upon the consideration applied by the individual to the purchase. That is, for example, a merchant and/or an issuer may wish, where an individual disputes a charge associated with an item, to ensure that an individual is credited only those funds that the individual actually applied to the item. For instance, it may be undesirable, from a merchant and/or issuer perspective, to permit an individual to (1) make a purchase with rewards currency, (2) dispute the charge, and (3) receive funds in exchange for rewards currency. Rather, a merchant and/or an issuer may prefer, during a dispute resolution process, to credit an individual an amount of funds as well as an amount of rewards currency actually applied by the individual to the original transaction.

To this end, a system 100 and/or 200 may retrieve a unique identifier associated with a transaction request (step 602). A unique identifier, as described above, may link or associate a funds request portion of a transaction request with a rewards currency portion of a transaction request. Thus, during a dispute resolution process, an FRCP system 106 may retrieve or look up an amount of rewards currency and/or funds applied to a transaction. FRCP system 106 may, based on this data, credit only the amount of funds to the individual's transaction account that the individual actually applied to a disputed transaction. FRCP system 106 may further credit the amount of rewards currency to the individual's rewards account that the individual actually applied to the transaction. Thus, systems 100 and/or 200 may maintain an association between rewards currency and funds on a per item or per transaction basis, and this association may permit systems 100 and/or 200 to credit funds and rewards currency in a same proportion that an individual has applied each to a particular item or transaction. For further information regarding dispute resolution, see U.S. Pat. No. 7,249,113 issued on Jul. 24, 2007 and entitled System And Method For Facilitating The Handling Of A Dispute and U.S. Pat. No. 7,725,385 issued on May 25, 2010 and entitled System and Method for Facilitating the Handling of a Dispute using Disparate Architectures, both of which are hereby incorporated by reference in their entireties, including features and functions.

Systems, methods and computer program products are provided. In the detailed description herein, references to "one embodiment", "various embodiments", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with various embodiments, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, various components, modules, and/or engines of system 100 may be implemented as microapplications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.\

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

A firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or various embodiments combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to an "entity" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," "individual," and/or the plural form of these terms are used interchangeably throughout herein to refer to those persons or entities that are alleged to be authorized to use a transaction account.

The system may include or interface with any accounts or devices, a transponder and reader in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in various embodiments, B alone may be present in various embodiments, C alone may be present in various embodiments, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a dispute resolution computer-based system, a submission having an identifier that associates a funds request with a rewards currency request, wherein the funds request comprises a request to apply funds to a split transaction and the rewards currency request comprises a request to apply rewards currency to the split transaction;

determining, by the computer-based system, that the identifier is associated with a request for the split transaction, wherein the request comprises both the funds request and the rewards currency request;

authorizing, by the computer-based system, the split transaction by obtaining a first authorization for the funds request and a second authorization for the rewards currency request, wherein first authorization is for a reduced amount, wherein the reduced amount is an amount of the transaction less a monetary value associated with the rewards currency request;

debiting, by the computer-based system, a rewards account based upon the rewards currency request; and debiting, by the computer-based system, a transaction account the reduced amount of the split transaction, wherein the reduced amount is the amount of the transaction less the monetary value associated with the rewards currency request;

resolving, by the computer-based system, a dispute associated with the split transaction, wherein the resolution comprises:

retrieving the identifier associated with the split transaction;

determining, based on the identifier, a rewards amount;

crediting the rewards amount to the rewards account;

determining, based on the identifier, the reduced amount; and crediting the reduced amount to the transaction account, wherein the reduced amount is the amount of the transaction less the monetary value associated with the rewards currency request.

2. The method of claim 1, further comprising generating, by the computer-based system, a first statement that shows a funds balance and a second statement that shows a rewards currency balance.

3. The method of claim 2, wherein the first statement shows a funds balance that is credited by an amount associated with the funds request, and the second statement shows a rewards currency balance that is credited by an amount associated with the rewards currency request.

4. The method of claim 1, further comprising resolving, by the computer-based system, a plurality of disputes associated with a plurality of account issuers.

5. The method of claim 1, further comprising resolving, by the computer-based system, a plurality of disputes associated with a plurality of merchants.

6. The method of claim 1, further comprising retrieving, by the computer-based system, an amount associated with the funds request and an amount associated with the rewards currency request based upon the identifier.

7. A system comprising:

a dispute resolution processor;

a tangible, non-transitory memory communicating with the processor;

the tangible, non-transitory memory having instructions stored thereon that, in response to execution by the processor, cause the processor to perform operations comprising:

receiving, by the dispute resolution processor, a submission having an identifier that associates a funds request with a rewards currency request, wherein the funds request comprises a request to apply funds to a split transaction and the rewards currency request comprises a request to apply rewards currency to the split transaction;

determining, by the processor, that the identifier is associated with a request for the split transaction, wherein the request comprises both the funds request and the rewards currency request;

authorizing, by the processor, the split transaction by obtaining a first authorization for the funds request and a second authorization for the rewards currency request, wherein first authorization is for a reduced amount, wherein the reduced amount is an amount of the transaction less a monetary value associated with the rewards currency request;

debiting, by the processor, a rewards account based upon the rewards currency request; and debiting, by the processor, a transaction account the reduced amount of the split transaction, wherein the reduced amount is the amount of the transaction less the monetary value associated with the rewards currency request;

resolving, by the processor, a dispute associated with the split transaction, wherein the resolution comprises:

retrieving the identifier associated with the split transaction;

determining, based on the identifier, a rewards amount;

crediting the rewards amount to the rewards account;

determining, based on the identifier, the reduced amount; and crediting the reduced amount to the transaction account, wherein the reduced amount is the amount of the transaction less the monetary value associated with the rewards currency request.

8. The system of claim 7, further comprising generating, by the processor, a first statement that shows a funds balance and a second statement that shows a rewards currency balance.

9. The system of claim 7, wherein the first statement shows a funds balance that is credited by an amount associated with the funds request, and the second statement shows a rewards currency balance that is credited by an amount associated with the rewards currency request.

10. The system of claim 7, further comprising resolving, by the processor, a plurality of disputes associated with a plurality of account issuers.

11. The system of claim 7, further comprising resolving, by the processor, a plurality of disputes associated with a plurality of merchants.

12. The method of claim 7, further comprising retrieving, by the processor, an amount associated with the funds request and an amount associated with the rewards currency request based upon the identifier.

13. An article of manufacture including a non-transitory, tangible computer readable storage medium having instructions stored thereon that, in response to execution by a dispute resolution computer-based system, cause the computer-based system to perform operations comprising:

receiving, by the computer-based system, a submission having an identifier that associates a funds request with a rewards currency request, wherein the funds request comprises a request to apply funds to a split transaction and the rewards currency request comprises a request to apply rewards currency to the split transaction;

determining, by the computer-based system, that the identifier is associated with a request for the split transaction, wherein the request comprises both the funds request and the rewards currency request;

authorizing, by the computer-based system, the split transaction by obtaining a first authorization for the funds request and a second authorization for the rewards currency request,
  wherein first authorization is for a reduced amount,
  wherein the reduced amount is an amount of the transaction less a monetary value associated with the rewards currency request;
debiting, by the computer-based system, a rewards account based upon the rewards currency request; and
debiting, by the computer-based system, a transaction account the reduced amount of the split transaction,
  wherein the reduced amount is the amount of the transaction less the monetary value associated with the rewards currency request;
resolving, by the computer-based system, a dispute associated with the split transaction, wherein the resolution comprises:
  retrieving the identifier associated with the split transaction;
  determining, based on the identifier, a rewards amount;
  crediting the rewards amount to the rewards account;
  determining, based on the identifier, the reduced amount; and
  crediting the reduced amount to the transaction account, wherein the reduced amount is the amount of the transaction less the monetary value associated with the rewards currency request.

14. The article of claim 13, further comprising generating, by the computer-based system, a first statement that shows a funds balance and a second statement that shows a rewards currency balance.

15. The article of claim 13, wherein the first statement shows a funds balance that is credited by an amount associated with the funds request, and the second statement shows a rewards currency balance that is credited by an amount associated with the rewards currency request.

16. The article of claim 13, further comprising resolving, by the computer-based system, a plurality of disputes associated with a plurality of account issuers.

17. The article of claim 13, further comprising resolving, by the computer-based system, a plurality of disputes associated with a plurality of merchants.

* * * * *